Patented Aug. 26, 1947

2,426,420

UNITED STATES PATENT OFFICE 2,426,420

PROCESS FOR PRODUCING AMMONIUM SULFAMATE

Ernest J. Tauch, Cleveland Heights, Ohio, assignor to E. I. du Pont de Nemours & Company, Wilmington, Del., a corporation of Delaware No Drawing. Application July 19, 1945, Serial No. 606,034

6 Claims. (Cl. 23—114)

This invention relates to processes for producing ammonium sulfamate and more particularly to such processes in which non-gaseous sulfur trioxide is mixed with an amount of liquid ammonia substantially in excess of that theoretically required for the reaction, the velocity of mixing being great enough that no substantial gaseous sulfur trioxide phase is formed.

It is possible to write a theoretical equation for the formation of ammonium sulfamate from ammonia and sulfur trioxide as follows:

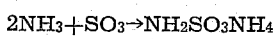

$$2NH_3 + SO_3 \rightarrow NH_2SO_3NH_4$$

According to this equation, 34 parts by weight of ammonia should combine with 80 parts of sulfur trioxide. If an additional half mol of ammonia were to react, the product might be expected to be ammonium imidodisulfonate:

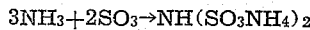

$$3NH_3 + 2SO_3 \rightarrow NH(SO_3NH_4)_2$$

Efforts to produce ammonium sulfamate by the direct combination of anhydrous ammonia and sulfur trioxide have hitherto led only to failure. Thus, it has been shown, in German Patents 562,738 and 668,142, that when reaction is effected between gaseous ammonia and gaseous sulfur trioxide the product consists principally of ammonium imidodisulfonate, $NH(SO_3NH_4)_2$, and that little or no ammonium sulfamate is formed in this reaction.

The reaction can be moderated by carrying it out in more than one stage. That is, the ammonia can be tied up with carbon dioxide as urea, the urea can be reacted with sulfuric acid to form urea bisulfate, and the urea bisulfate may then be reacted with liquid sulfur trioxide to give sulfuric acid and the sulfamic acid reacted with ammonia to give ammonium sulfamate. Conversely, the sulfur trioxide may be reacted with potassium sulfate to give potassium pyrosulfate which in turn may be reacted with liquid ammonia. Another method is to effect reaction between liquid sulfur dioxide and liquid ammonia to give an intermediate reaction product, which in turn can be reacted with sulfur trioxide to give ammonium sulfamate. Another method is first to tie up the ammonia in ammonium carbamate and then react this with sulfur trioxide.

Now according to the present invention it has been found that ammonium sulfamate can be formed by direct reaction between ammonia and sulfur trioxide if the ammonia is in the liquid state and the sulfur trioxide in a non-gaseous state, the proportion of ammonia is substantially in excess of that theoretically required for the reaction, and the sulfur trioxide and ammonia are mixed at a velocity great enough that no substantial gaseous sulfur trioxide phase is formed.

The present processes take advantage of the economy of operation which is inherent in the direct production of ammonium sulfamate from ammonia and sulfur trioxide. The excess ammonia used in the processes of the present invention may be recycled and used in a subsequent reaction step. Moreover, the portion of ammonium sulfamate product not recovered from such excess liquid ammonia in the initial step is also recycled and recovered in a subsequent step.

The processes of this invention enjoy the further advantage that dissipation of the heat of the reaction, always a problem in making sulfamic acid or ammonium sulfamate, is very easily and simply accomplished by boiling off a portion of the excess liquid ammonia. Such boiled-off fraction is very easily recovered, as by means of a reflux condenser. Condensing of the ammonia vapor to the liquid form is facilitated by applying pressure as well as cooling to the vapor.

The term "non-gaseous sulfur trioxide" is used herein to refer to sulfur trioxide in either the solid or liquid state. The solid material may be in the alpha, beta, or gamma form. For maximum yield the sulfur trioxide should be substantially anhydrous.

The liquid ammonia used should also be substantially anhydrous. In order to minimize ammonia evaporation it is advantageous to keep the liquid ammonia at a low temperature and under pressure.

As stated above, 34 parts by weight of ammonia theoretically will combine with 80 parts by weight of sulfur trioxide. However according to the present invention it has been found necessary that the proportion of liquid ammonia present in the reaction zone should be substantially in excess of the theoretical requirement. It is preferred to use at least ten cubic feet of liquid ammonia per square foot of area of solid sulfur trioxide exposed to the liquid ammonia for reaction. If the sulfur trioxide is in liquid form, the volume of ammonia circulated into the reaction zone is generally adequate if it is about 300 times the volume of $SO_3$ injected into the reaction zone per unit of time.

In the zone of contact between the non-gaseous sulfur trioxide and the liquid ammonia velocity of mixing should be great enough to prevent any gaseous sulfur trioxide phase from forming. To the extent that this condition is not met ammonium imidodisulfonate will form.

The reaction is violently exothermic and the heat of reaction must be dissipated, else gaseous sulfur trioxide will be generated. This heat can be dissipated by evaporation of liquid ammonia but it has been found that the mere spontaneous evaporation of ammonia is not the best way to conduct the heat away from the zone of reaction; rather, high velocity mixing is a preferable way to accomplish this result.

In the present novel processes the reaction occurs within a body of liquid ammonia. It is desirable to have general agitation of this body of ammonia in order to avoid formation of gaseous sulfur trioxide. This may be accomplished by any suitable stirring mechanism such as a paddle agitator or a pump for circulating the liquid. It is particularly important to have intensive mixing at the point of contact of the reactants. Adequate mixing is not achieved if gaseous sulfur trioxide is formed and failure to provide such adequate mixing to assure the uniform and complete reaction of $SO_3$ as added involves the danger of violent and uncontrollable reaction and the sudden formation of excessive pressure within the reactor.

The formation of a gaseous sulfur trioxide phase at the point of mixing of the liquid ammonia and non-gaseous sulfur trioxide is accompanied by a substantial rise in the temperature at that point. This may be attributable to the poor heat conductivity of the gaseous sulfur trioxide, which may act to prevent dissipation of the heat of reaction by evaporation of excess liquid ammonia. Whether this explanation is correct or not, the fact remains that the presence of gaseous sulfur trioxide is indicated by a temperature, at the point of mixing of the reactants, above the boiling point of liquid ammonia at the pressure employed. Similarly, such a temperature at this point indicates inadequate local agitation.

Intensive local mixing is conveniently accomplished by the use of jets. Thus a jet of liquid sulfur trioxide may be forced, under high pressure, into a flowing body of liquid ammonia. If the sulfur trioxide is in solid form, a jet of liquid ammonia may be caused to impinge on the surface thereof. This may be done beneath a body of liquid ammonia. The surface of the solid sulfur trioxide may be protected from contact with the liquid ammonia except in the area impinged upon by the jet of ammonia. Thus, solid sulfur trioxide in stick form may be injected into a tank containing an agitated body of liquid ammonia, the level of the ammonia being above the point of injection. The stick of sulfur trioxide may be gradually injected, the rate of advancement being equal to the rate of reaction so that only a plane area of the sulfur trioxide is exposed. Upon this plane area a high velocity jet of liquid ammonia may impinge.

If desired, the sulfur trioxide may be introduced into the body of liquid ammonia in association with a compound selected from the group consisting of ammonium sulfate, ammonium imidodisulfonate, and ammonium sulfamate. With each of these compounds sulfur trioxide forms an intermediate product which is liquid and which contains the sulfur trioxide in a form reactive with liquid ammonia. Any excess of sulfur trioxide forms a second liquid phase which may be separated out. The intermediate product may then be mixed with a suitable proportion of liquid ammonia, the velocity of mixing being great enough that no substantial gaseous sulfur trioxide phase is formed. The volume of liquid ammonia should be substantially in excess of that required theoretically to react with the available sulfur trioxide. The considerations regarding mixing and excess ammonia already described above of course apply to this embodiment of the invention.

After mixing, and the reaction attendant thereupon, the mixed products may proceed to a separation zone where the ammonia vaporized by the heat of reaction may be separated from liquid components. Such vaporized ammonia may be condensed in a reflux condenser and returned to the reaction.

The product may be recovered from the excess liquid ammonia by evaporating off the ammonia completely, or by evaporating some of the ammonia and cooling, the ammonium sulfamate thereby being caused to crystallize out. Such crystals may be filtered off or otherwise separated out and the mother liquor may be returned to the reaction. If a substantial proportion of ammonium sulfate or ammonium imidodisulfonate is present it may be removed by filtration of the reaction medium prior to removal of all of the liquid ammonia and consequent crystallization of the sulfamate.

The product obtained according to processes of this invention contains at least a substantial proportion of ammonium sulfamate. If the formation of gaseous sulfur trioxide has not been completely avoided the product may also contain some ammonium imidodisulfonate.

The practice of this invention will be better understood by reference to the following illustrative example:

*Example*

A body of solid sulfur trioxide was introduced into a rapidly agitated body of liquid ammonia by dropping a sealed ampoule containing 1.23 parts by weight of solid sulfur trioxide into a vacuum-jacketed reactor containing 177.1 parts by weight of liquid ammonia and breaking the submerged ampoule. The weight ratio of ammonia to sulfur trioxide was 144:1. The conditions of agitation and manner of introducing the solid sulfur trioxide were such that no substantial gaseous phase of sulfur trioxide was formed. A rapid reaction took place with vaporization of ammonia. Following the reaction the excess ammonia was evaporated off and the solid product obtained was found to contain a relatively large proportion of ammonium sulfamate and relatively lesser proportions of ammonium imidodisulfonate and ammonium sulfate.

While in the foregoing description there have been shown certain processes for producing ammonium sulfamate it will be understood that without departing from the spirit of the invention one skilled in the art may employ various processes.

I claim:

1. In a process for producing ammonium sulfamate the step comprising slowly mixing non-gaseous sulfur trioxide with an amount of liquid ammonia substantially in excess of that theoretically required for the reaction while agitating rapidly at the point of mixing, the velocity of agitation being great enough that no substantial gaseous sulfur trioxide phase is formed.

2. In a process for producing ammonium sulfamate the step comprising slowly mixing solid sulfur trioxide with an amount of liquid ammonia substantially in excess of that theoretically required for the reaction while agitating rapidly at the point of mixing, the velocity of agitation being great enough that no substantial gaseous sulfur trioxide phase is formed.

3. In a process for producing ammonium sulfamate the step comprising slowly mixing liquid sulfur trioxide with an amount of liquid ammonia substantially in excess of that theoretically required for the reaction while agitating rapidly at the point of mixing, the velocity of agitation being great enough that no substantial gaseous sulfur trioxide phase is formed.

4. In a process for producing ammonium sulfamate the steps comprising mixing liquid sulfur trioxide with a compound selected from the group consisting of ammonium sulfate, ammonium imidodisulfonate, and ammonium sulfamate, whereby a liquid intermediate product containing sulfur trioxide in a form reactive with liquid ammonia is formed, and slowly mixing this intermediate product with an amount of liquid ammonia substantially in excess of that theoretically required to react with the reactive sulfur trioxide content of the intermediate product to give ammonium sulfamate while agitating rapidly at the point of mixing, the velocity of agitation being great enough that no substantial gaseous sulfur trioxide phase is formed.

5. In a process for producing ammonium sulfamate the step comprising slowly mixing solid sulfur trioxide with liquid ammonia while agitating rapidly at the point of mixing, the velocity of agitation being great enough that no substantial gaseous sulfur trioxide phase is formed and at least ten cubic feet of liquid ammonia being present for each square foot of area of solid sulfur trioxide exposed to the liquid ammonia.

6. In a process for producing ammonium sulfamate the step comprising mixing solid sulfur trioxide with liquid ammonia by causing a jet of the liquid ammonia to impinge upon the solid sulfur trioxide, the area exposed to such impingement being surrounded by an agitated body of liquid ammonia and the velocity of ammonia from the jet being so great, relative to the exposed area of sulfur trioxide, that no substantial gaseous sulfur trioxide phase is formed.

ERNEST J. TAUCH.

REFERENCES CITED

The following references are of record in the file of this patent:

FOREIGN PATENTS

| Number | Country | Date |
| --- | --- | --- |
| 668,142 | Germany | Dec. 20, 1938 |